United States Patent [19]

Guillou et al.

[11] Patent Number: 5,140,634
[45] Date of Patent: Aug. 18, 1992

[54] METHOD AND APPARATUS FOR AUTHENTICATING ACCREDITATIONS AND FOR AUTHENTICATING AND SIGNING MESSAGES

[75] Inventors: Louis C. Guillou, Rennes, France; Jean-Jacques Quisquater, Brussels, Belgium

[73] Assignee: U.S Philips Corporation, New York, N.Y.

[21] Appl. No.: 776,701

[22] Filed: Oct. 9, 1991

Related U.S. Application Data

[63] Continuation of Ser. No. 704,891, Feb. 22, 1991, abandoned, which is a continuation of Ser. No. 241,527, Sep. 7, 1988, abandoned.

[30] Foreign Application Priority Data

Sep. 7, 1987 [FR] France .................. 87 12366

[51] Int. Cl.$^5$ .......................... H04K 1/00; H04K 9/00
[52] U.S. Cl. ........................... 380/23; 380/24; 380/25; 380/30; 235/382
[58] Field of Search ............... 380/23, 24, 25, 30; 235/382

[56] References Cited

U.S. PATENT DOCUMENTS

| 4,200,770 | 4/1980 | Hellman et al. | |
| 4,295,039 | 10/1981 | Stuckert | |
| 4,351,982 | 9/1982 | Miller et al. | |
| 4,638,120 | 1/1987 | Herve | |
| 4,736,423 | 4/1988 | Matyas | 380/23 |
| 4,799,258 | 1/1989 | Davies | 380/21 |
| 4,811,393 | 3/1989 | Hazard | 380/21 |

Primary Examiner—Stephen C. Buczinski
Attorney, Agent, or Firm—Anne E. Barschall

[57] ABSTRACT

A method and system for authentication of accreditations and of messages with zero-knowledge proof and for the signing of messages, and a station for use in such system, in particular executed as a smart card station.

Instead of using multiple accreditations and an iterative process of verification, use is made of a comprehensve accreditation (high exponent p) and a number D is drawn at random, which number is within the range between 0 and p−1. The operations of verifiction proceed by the computation of the D-th power of the inverse accreditation B.

Application in particular, to smart cards and, more specifically, to bank cards.

23 Claims, 5 Drawing Sheets

$$\textcircled{r_1} \;\; \textcircled{r_2} \cdots \textcircled{r_k} \;?$$

$$f(m, r_1^2 \bmod N, \ldots, r_k^2 \bmod N) = D = d_1 d_2 \cdots d_k$$

$$t_i = r_i B^{d_i} \bmod N$$

$$M = m, I, d_1 \cdots d_k, t_1 \cdots t_k$$

$$f(m, t_1^2 J^{d_1} \bmod N, \ldots t_k^2 J^{d_k} \bmod N) \stackrel{?}{=} d_1 \ldots d_k$$

FIG.5

$$\textcircled{r_1} \;\; \textcircled{r_2} \cdots \textcircled{r_k} \;?$$

$$D = d_{11} \ldots d_{1n}, d_{21} \ldots d_{2n}, \ldots, d_{k1} \ldots d_{kn} \quad (kn \text{ bits})$$
$$= f(m, r_1^2 \bmod N, \ldots r_k^2 \bmod N)$$

$$t_1 = r_1 B_1^{d_{11}} B_2^{d_{12}} \ldots B_n^{d_{1n}} \bmod N$$

----

$$t_i = r_i B_1^{d_{i1}} B_2^{d_{i2}} \ldots B_n^{d_{in}} \bmod N$$

----

$$t_k = r_k \cdot B_1^{d_{k1}} B_2^{d_{k2}} \ldots B_n^{d_{kn}} \bmod N$$

$$M = m, I, D, t_1 t_2 \ldots t_k$$

$$f(m, t_1^2 J_1^{d_{11}} \ldots J_n^{d_{1n}} \bmod N, \ldots t_k^2 J_1^{d_{k1}} \ldots J_n^{d_{kn}} \bmod N) \stackrel{?}{=} D$$

FIG.6

$$\textcircled{r} \; ?$$

$$D = f(m, r^P \bmod N)$$

$$t = r \cdot B^D \bmod N$$

$$M = m, I, D, t$$

$$f(M, t^P J^D \bmod N) \overset{?}{=} D$$

METHOD AND APPARATUS FOR AUTHENTICATING ACCREDITATIONS AND FOR AUTHENTICATING AND SIGNING MESSAGES

This is a continuation of application Ser. No. 07/704,891, filed on Feb. 22, 1990 which is a continuation of Ser. No. 07/241,527, filed on Sep. 7, 1988, both abandoned.

BACKGROUND TO THE INVENTION

The invention relates to a method for authentication of accreditations or of messages with zero-knowledge proof and to a method for the signing of messages. The invention also relates to a system for executing such authentication method and signing method and to a station for use in such a system.

The invention finds application in the verification of the authenticity of bank cards referred to as "smart" or, more generally, of the authenticity of any medium permitting its holder to control an access (to a set of premises, to a safe, to a database, to a computerized system, to a telephone line, etc.). It is also applicable to the verification of the authenticity of messages of any type, that are capable of controlling an opening or a closing, activating or deactivating a system, controlling the starting of an engine, controlling a satellite, triggering an alarm etc.. Finally, the invention permits the signing of a message in such a manner that its addressee is assured of its origin, and can in turn convince a third party as to such origin.

DESCRIPTION OF SELECTED PRIOR ART

The invention is based on two branches of cryptography, which are public-key cryptography and zero-knowledge-proof verification procedures respectively. For convenience, these two techniques are recalled briefly. Encoding and decoding techniques have developed considerably, inter alia through the availability of data processors and telecommunciation facilities.

In a cryptographic system, a message in clear M is transformed with the aid of a key E, to give an encoded message E(M). To the key E corresponds an inverse key D, which permits retrieval of the message in clear by an inverse transformation: $D(E(M)) = M$.

Traditionally, the keys E and D are kept secret and are known only to the interlocutors.

A novel cryptographic system has been developed, in which the encoding key is no longer kept secret but is published. Paradoxically, such revelation does not weaken the security of the system. The reason is that the knowledge of the key E does not, in practice, permit retrieval of the decoding key D. Such encoding function is called a "trap" function which is particularly difficult to invert, except for a person who knows the value of the trap. The general principles of these systems have been described in the article by W. DIFFIE and M. HELLMANN entitled "New Directions in Cryptography" in IEEE Trans. on Information Theory, vol. IT-22, pp. 644-654, November 1976. See also, the article by M. HELLMANN "The Mathematics of Public-Key Cryptography", Scientific American of August 1979, vol. 241, No. 2, pp. 146-157.

Public-key cryptography may be applied in a particularly effective manner in a system referred to as RSA. This system is described by Martin GARDNER in "A new kind of cipher that would take millions of years to break", Scientific American, August 1977, pp. 120-124.

In the RSA system, the trap function is the factorization of a number into prime components. Factorization is a difficult operation. For example, several minutes are required to find, manually, the prime factors of a modest number of 5 digits, such as 29,083. These numbers are 127 and 229. However, the obtaining of the product of 127 and 229 takes only a few seconds. The asymmetry of such an operation is therefore obvious. Recourse to a computer accelerates the factorization, but the fact remains that in order to factorize a number having two hundred digits the most powerful computers would be required. Thus, in practice, it is not possible to factorize a very large number.

These properties are exploited in the RSA system in the following manner. Two distinct prime numbers are chosen, namely a and b, and the product is formed: $N = a.b$. wherein N may have, for example, 500 bits. Further, an integer p is selected, which is prime with the smallest common multiple of $(a-1)$ and $(b-1)$. In order to encode a message, previously put into digital form M, M being in the range between O and $N-1$, the p-th power of M is calculated in the ring of integers modulo N, viz. $C = M^p$ and mod N. The function "raise to the power p modulo N" then defines a permutation of the integers from O and $N-1$.

In order to decode a message C, it is necessary to extract the p-th root of the encoded message C in the ring of integers modulo N. This operation amounts to raising the number C to the power d, d being the reciprocal of the exponent p modulo the smallest common multiple of the numbers $(a-1)$ and $(b-1)$. If the prime factors a and b are not known, the determination of d is impossible and, therefore, the deciphering operation is.

For example, selection of $a=47$ and $b=59$ gives $N=47.59=2773$. It is possible to take $p=17$. The coding key is therefore defined by the two numbers 2773 and 17. In practice, the numbers used are much larger.

The encoding of a word M which is presented in the form of the number 920 is as follows:

$C = 920^{17} \mod 2773 = 948 \mod 2773$.

Conversely, in order to decipher the number 948, use will be made of an exponent d which is the inverse of 17 modulo 1334, which is the LCM of 46 and 58. This exponent d is 157, since $157 \cdot 17 = 2669$, i.e. 1 modulo 1334. Thus, deciphering of 948 amounts to calculation of $948^{157}$ mod 2773, i.e. 920, which is indeed the initial message.

Thus, in the RSA system, the numbers N and p can themselves be public (reference is then made to the "public power p"), but the numbers a and b must remain secret. Naturally, it is possible to use more than two prime factors in order to form the number N.

The RSA system is described in U.S. Pat. No. 4,405,829 issued on Sep. 20th 1983. Such a system may serve not only to encipher but also to sign a message.

In the context of the signing of messages, an entity considered to emit messages M, being an entity referred to as a signatory, is considered to operate with a public key (N, p). This entity, in order to sign its messages before transmission, adds a redundancy thereto in order to obtain component of the ring of integers modulo N, and then raises this component to the power d (inverse of p) modulo. The entity in question, holding the secret parameters of the public key, that is to say the two prime factors a and b, has knowledge of d. The signed message is therefore $S = [RED(M)]^d \mod N$.

In order to verify the signature, the addressee of the message uses the public key (N, p) associated with the emitting entity and calculates $S^p$ and N, which, by hypothesis, gives once again the component encoding the message M with its redundancy. By retrieving the redundancy, the addressee thus concludes therefrom that the message could have been sent only by the entity which claims to have done this, since only that entity was capable of processing the message in this manner.

The operations of enciphering and of signature can be combined. In this case, the transmitter commences by signing its message while making use of its secret key; then, it enciphers it by making use of the public key of its correspondent. On receipt, the correspondent deciphers the message with the aid of its secret key, and then authenticates the message by using the public key of the emitter.

These techniques of cryptography thus lead to various methods of authentication. In order to explain in greater detail this aspect, there will be taken by way of example the authentication of bank "smart" cards without this constituting in any sense whatsoever a limitation of the scope of the invention.

A bank "smart" card possesses an identity, which is constituted by a string of information items such as the serial number of the chip, the number of the bank account, a period of validity and an application code. The card can, on request, present these identity information items, in the form of a sequence of bits forming a word I.

With the aid of redundancy rules, it is possible to form a number J which is twice as long as I, which will be hereinafter designated RED(I)=J. For example, if the number I is written in the form of quartets, each quartet can be supplemented by a redundancy quartet in such a manner as to form as many octets of the HAMMING encoding type. The number J is frequently referred to as the "shaded" identity, the shadow being constituted by the redundancy which accompanies the identity.

The International Standardization Organization has specifically stated these solutions in the note ISOTC97/SC20N207 entitled "Digital Signature with Shadow" which became a preliminary draft standard DP9796.

The authority empowered to issue such cards, in the present case the bank, chooses a public-key system (N, p). It publishes the number N and p, but keeps the factorization of N secret. The shaded identity J of each card is then considered as a component of the ring of integers modulo N. The bank can extract therefrom the p-th root in this ring, which, as stated above, requires the knowledge of the prime factors of N, which is the case. This number, hereinafter designated A is, to some extent, the identity of the card signed by the bank. This is referred to as "accreditation". The result of this is, by definition, $A = J^{1/p}$ mod N.

Authentication of an accreditation now amounts to reading the identity of the card, either in the simple form I or in the shaded form J, and then to reading the accreditation A from the card, raising the latter to the power p in the ring of integers modulo N, which is possible because the parameters N and p are known, and, finally, comparing the result, namely $A^p$ mod N, with J. If $A^p$ mod N is equal to J, then the accreditation A is authentic.

Although this method permits detection of false cards, it nevertheless presents a disadvantage which is that of revealing the accreditation of the authentic cards. A verifier lacking scrupulousness might therefore reproduce cards identical to that which he has just verified (cards which might be referred to as "clones") by reproducing the accreditation which he has read from the authentic card.

Now, the authentication of an accreditation does not, strictly speaking, require the communication of the latter to the verifier, but only the establishment of a conviction that the card has an authentic accreditation. The problem is, therefore, finally that of demonstrating that the card has an authentic accreditation, without revealing the latter.

This problem can resolved by a procedure referred to as "zero-knowledge proof". In such a procedure, the entity which attempts to adduce the proof, the "verified" entity, and the entity which awaits this proof, the "verifier", adopt an interactive and probabilistic behavior.

By itself, this technique has been described by Shafi GOLDWASSER, Silvio MICALI and Charles RACKOFF in their paper at the "17th ACM Symposium on Theory of Computing," May 1985, this paper being entitled "The Knowledge Complexity of Interactive Proof Systems" and published in the Reports, pp. 291-304. The prime examples were found in graph theory.

Adi SHAMIR was the first to think of using this process in number theory and it might be applied to smart cards in the following manner. This so-called S process is as follows:

At the start of the authentication operation, the card proclaims its identify I. The redundancy rules, which are publicly known, permit the deduction of J, twice as long as I, which gives the shaded identity. The card and the verifier both known the numbers N and p published by the card issuer, but only the latter has the factorization of the number N available, which is the trap information used to calculate the accreditations.

The authentication operation is continued by repeating the following processing:

the card draws, at random, a component r from the ring of integers modulo N, computes therefrom the p-th power ($r^p$ mod N) in the ring, and transmits this power to the verifier in the guise of title T for iteration;

the verifier draws, at random, a bit d (0 or 1) to interrogate the card in the guide of marker t: for d=0 the component r, and for d=1 the product of the component r and the accreditation in the ring (r.A mod N): in other words, if the draw is uncertain, the verified must have available r and r.A mod N, which implies the knowledge of A;

the verifier raises the marker t to the power p modulo N, to retrieve : for d=0, the title T, and for d=1 the product, in the ring, of the title T and the shaded identity J.

Thus, on the one hand, it is necessary to have available the accreditation A in order to posses simultaneously the two possible values of the marker t, viz. r and rA. On the other had, the verifier cannot deduce from this operation the value A of the accreditation since, even if he requests the verified to supply rA to him, he does not know r, which was drawn at random by the verified. The verifier does indeed known $r^p$, supplied by way of title by the verified, but is incapable of extracting therefrom the p-th root modulo N, because he does not known the factorization of N.

A verified who does not hold an authentic accreditation might bluff by attempting to guess the draw by the verifier. If he bets on "O" ("Tails") ,he estimates that the verifier will raise the title to the power p modulo N and that the verifier will compare the result obtained with the title T. In order to convince the verifier, the verified will have to supply by way of title T the marker raised to the power p. If the bluffer bets, on the other hand, on "1" ("heads"), he estimates that the verifier will raise the title to the power p and will then multiply the result obtained by J. In order to be convincing, he therefore must transmit, by way of title T, the marker raised to the power p multiplied by J.

In other words, the verified has one chance in two of giving a correct response if he reverses the chronology of the events, that is to say if he does not first of all determine the title T and then the marker t, but if he bets on the draw by the verifier and if he forms the title a posteriori with the aid of a marker drawn at random.

In this probabilistic process, the chances of the verified guessing the correct response are one in two in each processing, so that, in repeating this processing k times, the chances of the bluffer fall to $\frac{1}{2}^k$. The safety factor of this authentication process is therefore $2^k$. In practice, k is of the order of 16 to 24.

In such a process the number p is small, for example 3. It is also possible to use 2, but in this case certain precautions must be taken in the choice of the prime factors of the number N in order that the function "raise to the square modulo N" should be a permutation on the quadratic residues of the ring of integers modulo N. The numbers a and b must be integers of the form $4 \times + 3$; it is recalled that quadratic residues are components which are squares in the ring and the shaded identity J must be capable of being modified in a representative quadratic residue before computing the accreditation. This solution is described in the document already mentioned ISO/TC97/SC20/N207.

The integer N, as in the bank cards of today, may be of the form $N = K + 2^{320}$ where K is an integer of 240 bits which is published and known to all terminals. Only the issuer of cards has the factorization of N available. It is nevertheless recommended to use larger numbers.

The identity I, as in the bank cards of today, may be a symbol of 160 bits, which is obtained by the chaining of a serial number of the chip of 44 bits, of a bank account number of 76 bits, of an application code of 8 bits and of a period of validity of 32 bits. In these circumstances, the shaded identity has 320 bits. The accreditation is then the cube root of this word, modulo N. This is a number of 320 bits.

An improvement to this technique consists in using not the accreditation itself A ($A^p$ mod $N = J$) but its inverse, designated B. The result of this is $B^p J$ mod $N = 1$, which permits simplification of the comparison of the title and of the marker. It is then sufficient to transmit a marker equal to $r(dB - d + 1)$, which is equal either to r if $d = 0$ or to rB if $d - 1$, and to compute $t^p(dJ - d + 1)$ mod N in order to find the title T. It is then possible to transmit only a part thereof, for example about one hundred of its bits, or, even better, after a compression by a one-way function.

It is recalled that a compression function causes correspondence between a set of n components and a set of m other components, m being less than n, and such that it is virtually impossible to locate two components having the same image.

BRIEF DESCRIPTION OF THE DRAWINGS

The state of the art and the invention are furthermore explained with respect to the following Figures.

FIGS. 5, 6 likewise illustrate a signing process for the technique S and FS;

Further Figures are listed hereinafter.

EXTENSIVE EXPLANATION OF PARTICULAR TECHNIQUES

Figure 1:
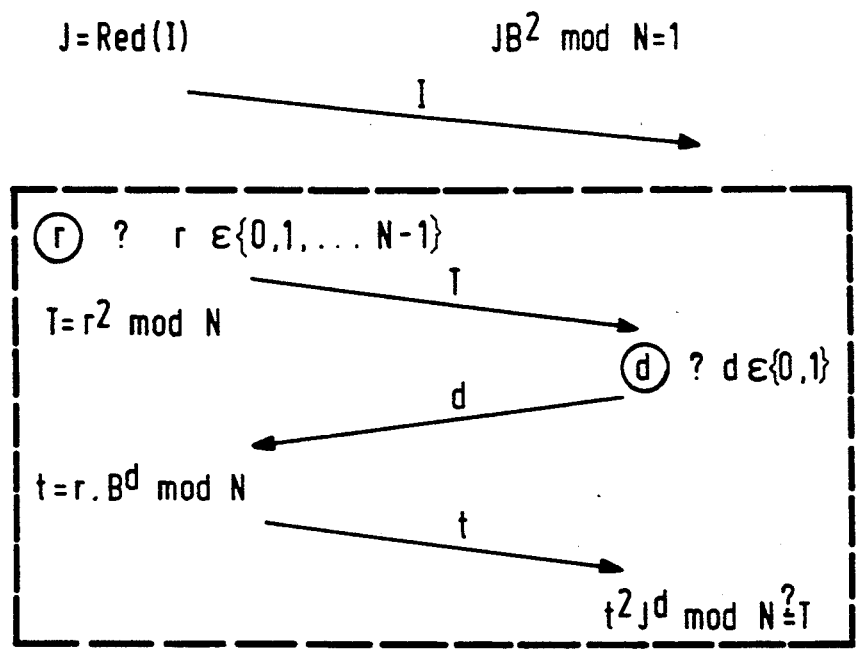
FIG. 1 represents the abovementioned probabilistic process.

FIG. 1 illustrates this process. The arrows extending from left to right represent a transmission from the verified to the verifier (identity I, title T, marker t) and the arrows extending from right to left a transmission in the opposite direction (bit d drawn at random). A draw at random is represented by a circle associated with a question mark. The symbol E signifies "is a member of" and the numbers between brackets designate the set of integers in the range between the two indicated limits, including the limits. The final comparison deciding on the authenticity of the accreditation is schematically represented by an equality sign surmounted by a question mark. The dashed block indicates a set of operations which are executed k times (iteration).

A process which is even further improved has recently been proposed, which makes use of multiple accreditations. This process has been described in the paper by Amos FIAT ad Adi SHAMIR, published in the Compte Rendu de CRYPTO' 86, Santa Barbara, CA, USA, August 1986, "How to Prove Yourself : Practical Solutions to Identification and Signature Problems', Springer Verlag, Lecture Notes in Computer Science, No. 263, pp. 186-194.

Noting several accreditations in the card leads to an increase in the efficiency of the processing, and to a reduction in the number security in relation to the luck left to the bluffer. In this method, n diversified identities I1. . . In, are produced, which supplemented by their shadows, given n shaded diversified identities J1 . . . Jn. The card contains the n inverse accreditations B1 . . . Bn, which verify the relations $Ji.Bi^p$ mod $N = 1$.

In this process, which will be designated as FS, each processing or iteration then becomes the following (taking 2 for the public exponent):

the card draws at random a component r in the ring of integers modulo N, and then transmits to the verifier 128 bits of the square of this component in the guise of title T;

the verifier draws at random a word in ln bits, i.e. b1 . . . bn, which he transmits to the card;

the card then computes the product of the component r and the inverse accreditations designated by the "1" bits in the words of n bits b1 . . . bn. Furthermore, the card transmits in the guise marker, the value t thus obtained:

$t = r.(b1.B1 - b1 + 1). . . . .(bn.Bn - bn + 1) \mod N$ the verifier tests this marker t by raising it to the square in the ring, and then by multiplying this square by the diverisfied shaded identities designated by the "1" bits of the word of n bits, i.e.: $t^p.(b1.J1 - b1 + 1). . . . .(bn.Jn - bn + 1) \mod N.$ The authenticity is proven if the published bits of the title T are retrieved.

Any person would be able to draw at random a marker t, and then, in the ring, to raise this to the square and to multiply by a selection of diversified identities in order to form a title T. In fact, if this title is given at the start of the processing, if the question asked is indeed the expected selection, then the marker t is an acceptable response which authenticates the card.

Thus a winning strategy exists for a person who guesses or knows in advance the draw by the verifier.

In order to pass successfully through an iteration, the bluffer must, this time, guess a word of n bits, and no longer just a single bit, as in the GMR process. If the $2^n$ values are equally probable, the product of the multiplication of the accreditations (n) by the number of iterations (k) reduces exponentially the chances left to the bluffer. The security factor of the authentication operation is then $2^{k \cdot n}$.

At each iteration, the verified transmits, for example, 128 bits (one quarter of the 512 bits) and a component of the ring, and the verifier transmits n bits. At each iteration, the verifier and the card compute a square and execute a number of multiplications which is equal to the number of "1" bits in the word of n bits (HAMMING weighting).

As another compromise between efficiency of the iterations and the maximum number of multiplications to be executed during the iteration, it is possible to limit the number of -1- bits in the word of n bits, to a certain fraction.

In connection with this technique, reference is made to the paper by Amos FIAT and Adi SHAMIR at the "5th World Congress on Computing and Communications Protection and Security", Paris on Mar. 4th-6th 1987, under the title "Unforgeable Proofs of Identity".

Figure 2:
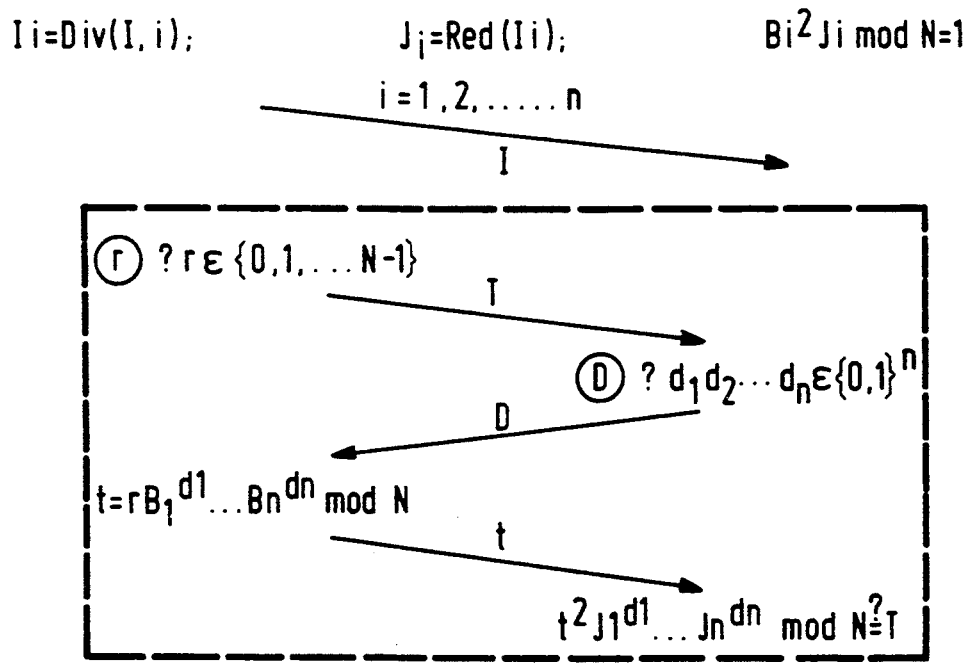
FIG. 2 likewise illustrates the FS process.

FIG. 2 attached illustrates diagrammatically this FS process, with the same conventions as for FIG. 1.

These processes for the authentication of accreditation may readily be adapted for the authentication of a message emitted by an entity considered to be accredited. In this case, the title T transmitted by the verified is no longer formed exclusively by $r^p$ mod N, as in the preceding case, but also by the message m to be authenticated. More specifically, it is the result obtained by a compression function, designated f, the arguments of which are m and $r^p$ mod N.

Figure 3:
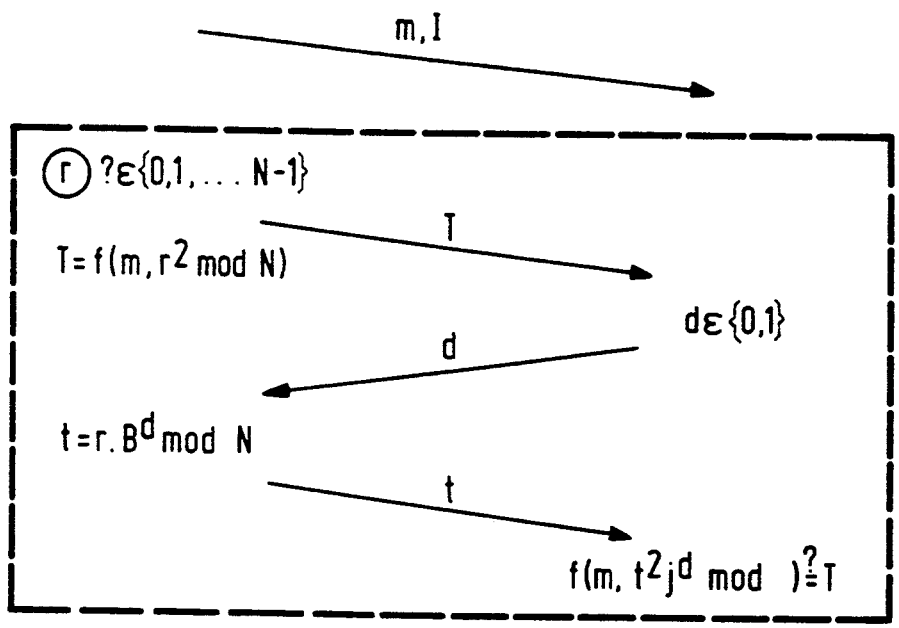
FIGS. 3, 4 likewise illustrate the processes for the technique S and FS.
Figure 4:
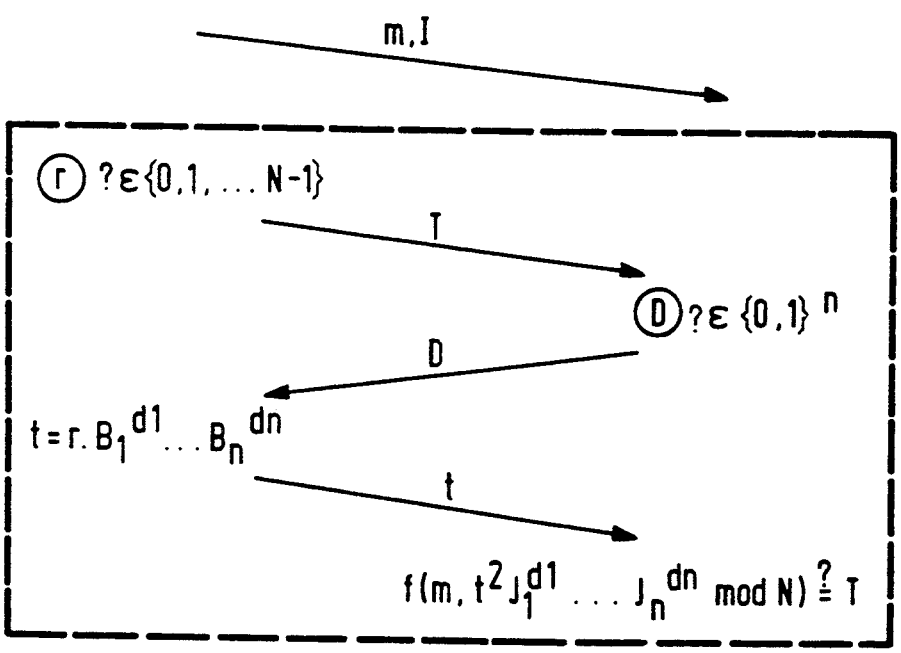

FIGS. 3 and 4 show schematically these processes in the case of the techniques S and FS.

Finally, these techniques may likewise serve to sign a message. The compression function then plays the part assigned to the draw by the veririfer. More specifically, in the process of type S, the signatory draws k components r in the ring of integers modulo N, namely r1, r2, ..., rk, which will play the part of the various values of r drawn in the course of the k iterations. The signatory raises these integers to the square mod N and computes the compression function $f(M, r^2 \bmod N, \ldots rk^2 \bmod N)$, which provides a number D having as bits d1, d2, ..., dk. Each bit di of this number plays the part which was played by the bit drawn at random in the process for the authentication of accreditation described hereinabove. The signatory then forms k markers $tri = riB^{di}$ mod N, with i=1, 2 ... k. The signed message is then a multiplet formed by m, I, d1, ... dk, t1, ..., tk.

In order to verify such a signed message, the titles t1 modulo N are raised to the square and each square is multiplied by $J^{di}$ modulo N. A computation is then made of the compression function $f(m, t1^2 J^{d1} \bmod N, \ldots, tk^2 J^{dk} \bmod N)$, and the result obtained is compared with the number D, i.e. with the bits d1, d2, ..., dk.

When applied to the signing of messages, the number k is larger than in authentication. It often has of the order of 60 to 80 bits and, more precisely, at least 30 bits. In fact, the verification is no longer undertaken in real time, and the fraudulent person therefore has plenty of time to formulate a false signature.

FIGS. 5 and 6 schematically represent this process in the case of the techniques S and FS, respectively. These techniques of the prior art present certain disadvantages. In particular, the method FS, with the multiplicity of its accreditations, takes up a large space in memory. Moreover, the need to undertake a repetition of the processings extends the duration of the exchanges. Finally, the multiplicity of markers extends the information items to be added to a message in order to sign it.

SUMMARY OF THE INVENTION

Among other things, it is an object of the invention to remedy this disadvantage. To this end, it utilizes a single accreditation (and no longer multiple accreditations) and a single processing (and no longer a repetition of processings).

More specifically, the subjects of the present invention are a method for the authentication of an accreditation and a method for the authentication of a message. These methods both utilizing on the one hand, the formulation of an accreditation based on the public-key system and, on the other, zero-knowledge proof;

a) so far as concerns the execution of the accreditation, it comprises the following operations.

an authority to issue accreditations chooses two prime numbers, forms the product (N) of these two numbers, keeps secret these numbers, which then constitute the prime factors of N, chooses an integer p and publishes N and p;

for each holder of an accreditation, a digital identity I is formed, and is then supplemented by redundancy in order to form a shaded identity word J, an accreditation A is formulated by the authority by taking the p-th root of the shaded identity in the ring of integers modulo N, ($A^p$ mod N=J), into an appropriate medium containing a memory, the authority loads the inverse modulo N of the accreditation A, i.e. a number B referred to as the inverse accreditation ($B^pJ$ mod N=1), this number B constituting the accreditation which is to be authenticated;

b) so far as concerns the authentication of the accreditation thus formulated, this operation comprises an interactive and probabilistic digital process of the zero-knowledge proof type and taking place between a medium containing an accreditation, this medium being referred to as "the verified" and an authentication element referred to as "the verifier", this process comprising at least one digital processing comprising the following known operations.

the verified draws first a random integer r which is a member of the ring of integers modulo N, the verified raises this integer r to the power p modulo N, the result being a title T, the verified then issues at least a portion of the bits of the title T, the verifier then draws, at random, a number D and requests the verified to undertake certain operations on r and on the inverse accreditation B, these operations being associated with the number D drawn at random by the verifier and being executed in the ring of integers modulo N, the verified issues to the verifier a number t, referred to as the marker, being the result of these operations, the verifier undertakes, in this turn, operations relating to the marker t issued by the verified and to the shaded identity J of the verified, these operations being themselves also associated with the number D drawn at random by the verifier and undertaken in the ring of integers modulo N, the verifier compares the result thus obtained with the bits of the title T which the verified has issued at the start of the verification process, and acknowledges the authenticity of the accreditation if he retrieves these bits.

The process for the authentication of accreditation according to the invention is characterized in that:

a) in the course of the formulation of the accreditation (B) the number p serving to extract the p-th root of the shaded identity (J) chosen to comprise at least ten bits, b) for the authentication of the accreditation the process comprises only a single interactive and probabilistic processing (and not a repetition of such a processing), this single processing consisting of the following operations:

the number which the verifier draws at random is an integer D within the range between O and p−1 (including the limits), the operation which the verified executes in order to issue a marker t is the product, in the ring of integers modulo N, of the component r which it has itself drawn at random, and the D-th power of the inverse accreditation B, the title being then $t = r.b^D \bmod N$, the operations which the verifier executes are the product, in the ring of integers modulo N, of the p-th power of the marker t and the D-th power of the shaded identity J, i.e. $t^p J^D \bmod N$, The comparison operation executed by the verifier then relates to the bits of the title T which are issued by the verified and to the bits obtained by the preceding operation, the authenticity of the accreditation being acquired in a single processing since all the bits of the title issued by the verified are retrieved by the verifier in $t^p J^D \bmod N$.

On the other hand, so far as concerns the process for the authentication of a message, the process according tot he invention is characterized in that:

a) in the course of the formulation of the accreditation of the principal, the number p serving to extract the p-th root of the shaded identity comprises at least ten bits, b) for the authentication of the message, the process comprises only a single interactive and probabilistic processing (and not a repetition of such a processing), this single processing consisting of the following operations:

the number which the verifier draws at random is an integer D within the range between O an p−1 (including the limits), the operation which the verified executes in order to issue the marker t is the product, in the ring of integers modulo N, of the component r which it has itself drawn, and the D-th power of the inverse accreditation B, the marker then being $r.B^D \bmod N$, the operations which the verifier executes are generating the product, in the ring of integers modulo N, of the p-th power of the marker t, and the D-th power of the shaded identity J, the verifier forms a compression function of the message and of the result of the preceding operations, i.e. $f(m, t^p J^D \bmod N)$, the comparison which the verifier executes then relates to the compression function which he has obtained and to the title T which the verified has issued to him at the start of the verification process, the authenticity of the message being acquired in a single processing since, at the end of this processing, there is equality between all the bits of the compression function obtained by the verifier and the corresponding bits of the title which are issued by the verified.

Finally, the subject of the invention is a process for the signing of a message. In this case, the accreditation of the signatory is formulated according to the known public-key process described hereinabove and the signature consists of a known probabilistic digital processing comprising the following operations:

the signatory draws, at random, at least one integer r which is a member of the ring of integers modulo N, the signatory raises this integer r to the power p modulo N, the signatory computes a compression function f by adopting as arguments the message m to be signed and the power $r^D \bmod N$ obtained, the signatory forms at least one marker t by executing certain operations on r and on the inverse accreditation B, these operations being associated with the number D drawn at random and being executed in the ring of integers modulo N, the signatory transmits the message m, its identity I, the word D, the marker or markers t, the total forming a signed message.

The process for the signing of a message according to the invention is characterized in that:

a) in the course of the formulation of the 1 the accreditation of the signatory the number p serving to extract the p-th root of the shaded identity is chosen to be large and comprises a plurality of tens of bits, b) for the operation of signing the message:

the signatory draws, a random single integer r which is a member of the ring of integers modulo N, the compression function has, as arguments, the message m and the p-th power of r, which provides a number D, the sole marker produced by the signatory is the product, in the ring of integers modulo N, of the integer r and the D-th power of the inverse accreditation B, the signatory provides, with the message m, its identity I, the word D and the marker t.

In the first two processes, the number p comprises at least 10 bits and preferably between 16 and 24 bits.

In the process of signing, the number p is larger and comprises a plurality of tens of bits, for example from 60 to 80 bits, or, anyway, at least thirty.

The value of p is, in fact, the security factor of an elementary processing. If p is appropriate for the sought object, although only a single comprehensive accreditation is available, it is possible to be content with a single processing.

BRIEF DESCRIPTION OF THE DRAWINGS (CONTINUED)

Figure 7:
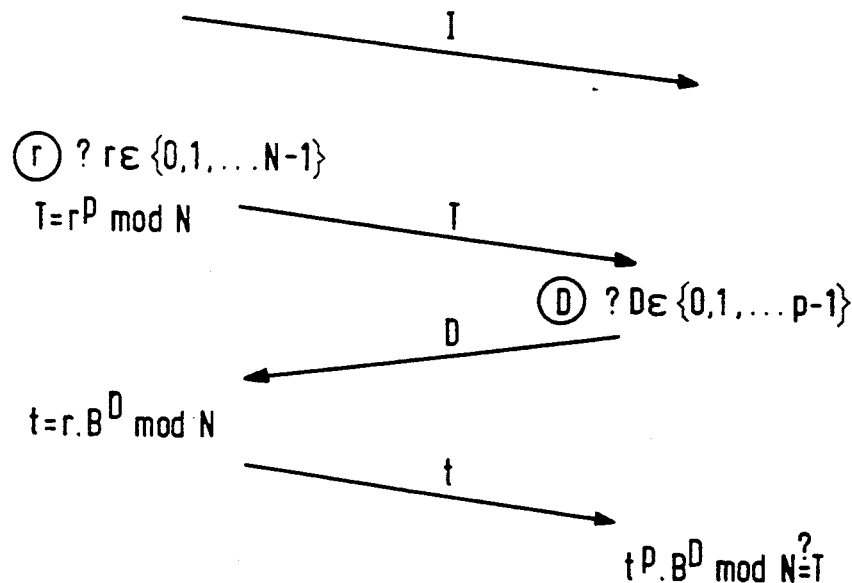
Figure 8:
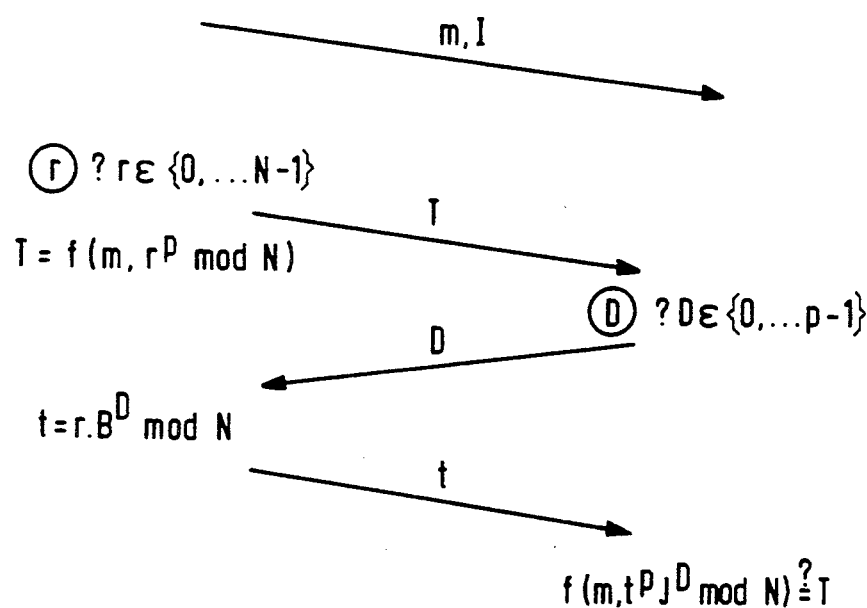
Figures 9, 10:
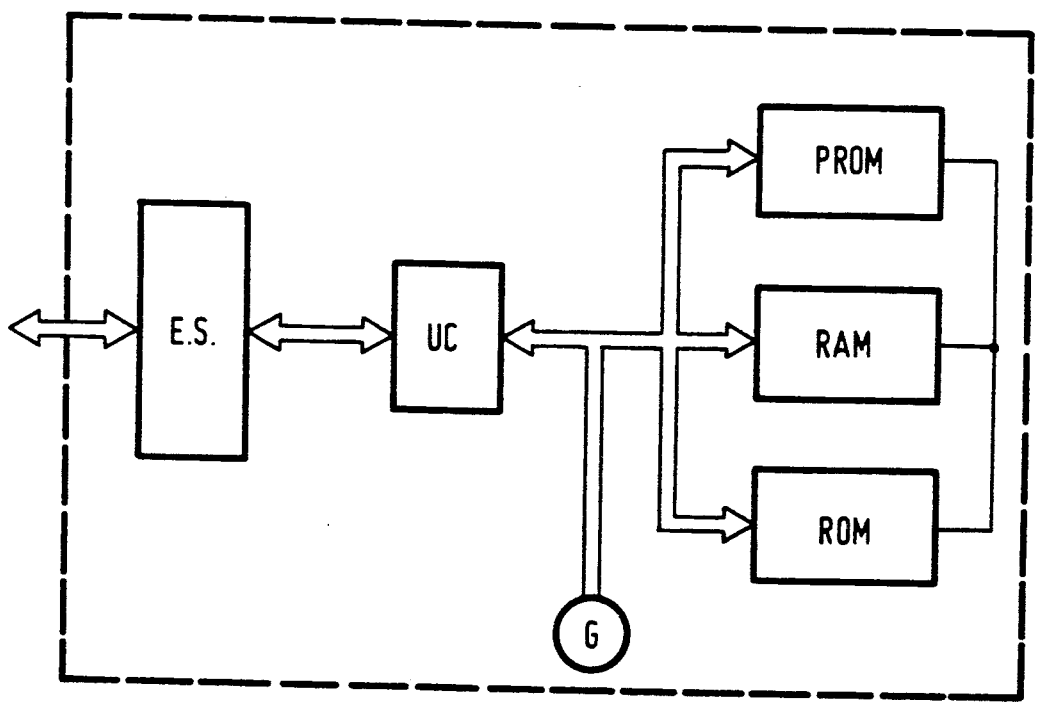

The invention will be better understood in the light of the description which will follow, which refers to accompanying drawings. These drawings comprise:

FIGS. 1 to 6, already described, which illustrate the process S and FS of the prior art;

FIG. 7 illustrates the process for the authentication of an accreditation according to the invention;

FIG. 8 illustrates the process for the authentication of a message according to the invention;

FIG. 9 illustrates the process for signing a message according to the invention;

FIG. 10 shows diagrammatically an assembly permitting the implementation of the processes of the invention.

DESCRIPTION OF A PREFERRED EMBODIMENT

The conventions used in FIGS. 7 to 9 are the same as those of FIGS. 1 to 6. In all cases, the accreditation is obtained by the use of a number p which is large. This accreditation is called "comprehensive", as opposed to the customary accreditations for which p was of the order of 2 or 3 and which are relatively "superificial".

Thus, in the case of smart cards, the following processing is done:

the card draws, at random, a component r ($1 \leq r \leq N-1$) in the ring of integers modulo N, and gives, in the guise of title T, 128 bits of the public power of this component ($r^p$ mod N);

The verifier draws, at random, an exponent D form O to p−1 and transmits it to the card;

the card computes the marker t which is the product (in the ring) of the component r and the D-th power of the accreditation B ($t = r.B^D$ mod N);

The verifier computes, in the ring, the product of the p-th power of the marker t and the D-th power of the shaded identity J, i.e. $t^p.J^D$ mod N.

The proof is accepted if all the published bits of the title T are thus retrieved.

Any one that has guessed the question of the verifier (the exponent D) can draw, at random, a marker t, and then undertake in advance the computations of the verifier, that is to say form the product, in the ring, of the marker t to the exponent p and the shaded identity J to the exponent D. if the title T is given at the start of the iteration, and if the question posed is indeed D, then the marker t is an acceptable response.

This reasoning, indicating a winning strategy for the person guessing, shows that it is not possible to distinguish data originating from the recording of a successful operation and data originating from a masquerade constructed by inverting the chronology of the iteration, that is to say by choosing the exponents before the titles. The verifier collects information items which are impossible to distinguish from those which he could have produced alone, without interaction with the verified, which shows that the accreditation does indeed remain secret in the card.

In order to complete successfully an authentication processing, the bluffer must guess an exponent D. If the p-values of D are equally probable, the chance left to the bluffer is 1/p. The security factory is therefore p.

In such a processing, the verified transmits approximately one hundred bits and a component of the ring; the verifier transmits an exponent (D). In order to complete a processing, the verified computes, first of all, the public power of the component r drawn at random, and then the product of this component r and the D-th power of the accreditation B. The verifier undertakes slightly less computation for the purpose of retrieving the title T, since he can intelligently combine the power computations: the D-th power of the shaded identity J and the p-th power of the marker t.

If the exponent p has the value of $2^{16}$, then the exponent D is a number having 16 bits. Thus, in a single processing, with a security factor of $2^{16}$, i.e. 65536, the verified computes in the ring 16 squares, and then 16 squares and a mean of 8 multiplications. The verifier computes only 16 squares and proceeds, on average, with 8 multiplications.

The process for the authentication of a message is illustrated in FIG. 8 with the same conventions, the difference in relation to FIG. 7 consisting solely in the formation of the compression function f.

In order to sign a message, the holder of the accreditation B of comprehensiveness p commences by drawing, at random, a component r in the ring, and then computes the public power of the component $r(r^p$ mod N). He then produces an exponent D by virtue of the compression function f applied to the concatenation of the message m and of the public power of the component r. The marker t is the product of the component r and the D-th power of the accreditation B. The singed message is the concatenation of the identity I, of the message m, of the exponent d and of the marker t.

In order to verify a signature, the verifier computes in the ring the product of the marker t to the power p and the shaded identity J (reconstructed from the proclaimed identity I) to the power D in order to reconstitute wheat must be the public power of the component r. Finally, the verifier must retrieve the exponent D by applying the function f to the concatenation of the message and of the reconstituted public power. This is illustrated in FIG. 9.

If p is written in 64 arbitrary bits, the signatory undertakes approximately 192 multiplications in the ring (he must compute successively two powers with exponents of 64 bits without being able to combine them) in order to complete the operation. This complexity is already markedly less than that of the RSA process: 768 multiplications, on average, for an exponential modulo a composite number in 512 bits, and 1536 for a composite number in 1024 bits.

If p is written in 64 arbitrary bits, the verifier undertakes only approximately 112 multiplications, since be combines his operations into 64 squares and three times 16 multiplications, on average, in order to compute a single step $t^p.J^D$ mod N. It is fortunate that the authentication is simpler than the formulation of the signature, since each signature is called upon to be verified several times.

However, it is possible to choose $2^{64}$ (that is to say a power of 2) as exponent p in order to simplify the computations, without modifying the security of the system. The raising to the power p is then undertaken by 64 squares. The exponent D is a number of 64 bits. The signature is then undertaken in 160 multiplications. The verification of a signature is reflected, on average, in 96 multiplications in the ring, i.e. 12.5% of the RSA with 512 bits and 6.2% of the RSA with 1024 bits.

In the earlier process FS described hereinabove with 64 multiple accreditations in the same card, one square and an average of 32 multiplications are required. Thus, the method of the invention involving comprehensive accreditation is utilized at the cost of a surplus of computations by a multiplicative factor of the order of 3. When, in the prior art, there is a limitation to 8 accreditations in the card, with 8 markers in the signature (8 iterations at 5 multiplications, i.e. 40 multiplications), the ratio dimishes slightly further, in favour of the invention.

It is certainly also possible to choose $2^{64}+1$ as public exponent (that is to say an odd number). At the cost of only one supplementary multiplication to compute a public power, certain restrictions are lifted in this way with regard to the quadratic residues in the ring (when the exponent p is even, several elements of the ring may correspond to the p-th root, but only one is appropriate).

FIG. 10 shows diagrammatically a computer which permits the invention to be implemented, among other things for executing the authentication process. For simplicity, the other station communicating with this computer, has not been shown. Either or both stations may be physically realized in a so-called smart card, that, for other purposes, has been published extensively.

The computer shown comprises an input-output interface IO, a central unit CU, a programmable memory of the read-only type (PROM), a read-only memory (ROM) and a random access memory (RAM). The computer further comprises an element G of the noise-generator or random-generator type.

The accreditation and the identity information items recorded in the memory PROM are inaccessible from outside. The programs are recorded in the memory ROM. The memory RAM serves to store computation results. The generator G is sued for drawing of the various numbers participating in the process (r, D).

The central unit and the memories may be structured as the monolithic self-programmable microcomputer described in U.S. Pat. No. 4,382,279.

The compression function may relay upon the DES (Data Encryption Standard) algorithm. There is in existence a smart card, which executes this DES algorithm.

What is claimed is:

1. A system for the authentication of an accreditation information A with zero-knowledge proof, this information having been formulated by a process of the public-key type comprising the following operations:

an authority issuing the accreditation chooses two prime factors, forms the product N of these two factors, keeps secret these factors, chooses an integer p that comprises at least ten bit positions and publishes N and p, for the holder of the accreditation, a digital identity I is formed, and supplemented by redundancy in order to form a shaded identity word J, accreditation information A is formulated by the authority by taking the p-th root of the shaded identity J in the ring of integers modula N, ($A = J^{1/p}$ mod $N = J$), said system comprising a memory for storing inverse information modulo N of the accreditation information A, i.e. the inverse accreditation information B ($B^p$ j mod $N = 1$), which is to be authentication, processing means for executing the authentication operation by means of a single-layer interactive and probabilistic digital process of the zero-knowledge proof type and comprising communication means for communicating between a medium containing the memory called "the verified" and an element called "the verifier", said processing means comprising:

in the verified first random number generating means for generating a first random integer r that is a member of the ring of integers modulo N, power raising means fed by the first random number generating means for raising r to the power p modulo N to produce a title T, first transmission means fed by the power raising means for transmitting at least a predetermined bit portion of the title T to the verifier, in the verifier second random number generating means for generating a second random number (D) within the interval O and (p−1), including the limits thereof, request means cum second transmission means fed by the second random number generating means for generating and transmitting a processing request to the verified, in the verified first calculating means fed by the second transmission means to calculate the product in the ring of integers modulo N of the first random integer r, and the D-th power of the inverse accreditation information B to feed the result thereof as a marker $t = r.b^D$ mod N to the first transmission means, in the verifier second calculating means fed by the first transmission means for calculating the product of the marker t, within the ring of integers moduluo N, and the D-th power of the shaded identity J, i.e. $t^p j^D$ mod N, in the verifier comparing means fed by the second calculating means and by the first transmission means for comparing said predetermined bit portion to a corresponding bit portion of $t^p j^D$ mod N for in a single comparisons step upon a detected equality issuing an authenticated accreditation signal.

2. A station for use as the "verified" in a system as claimed in claim 1.

3. A station as claim 2, manufactured in the shape of a smart card.

4. A station for use as the "verifier" in a system as claimed in claim 1.

5. A station as claimed in claim 4, manufactured in the shape of a smart card.

6. A system for the authentication of a message m originating from a presumably accredited principal, by means of a digital word B obtained by a public-key process comprising the following operations:

an authority issuing the accreditation chooses two prime numbers, forms the product N of these two numbers, chooses an integer p, and publishes N and p, for the principal a digital identity is formed and supplemented by redundancy to form a shaded identity word J, accreditation information A is formulated by taking the p-th root of the shaped identify J in the ring of integers modulo N, ($A = J^{1/p}$ mod N), said system comprising a memory for storing inverse information modulo N of the accreditation information A, i.e., the inverse accreditation information B ($B^p$ j mod $N = 1$), processing means for executing the authentication operation by means of a single-layer interactive and probabilistic process of the zero-knowledge proof type and comprising communication means for communicating between a medium containing the memory called "the verified" and am authentication element called "the verifier", said processing means comprising:

in the verified first random number generating means for generating a first random integer r that is an element of the ring of integers modulo N, power raising means cum first compression means fed by the first random number generating means for raising r to the power p modulo N and computing a result by means of a compression function that has as arguments the message m and $r^p$ mod N, said result constituting a title T, first transmission means fed by the first compression means for transmitting at least a predetermined bit portion of the title T to the verifier, in the verifier second random generating means for generating a second randon number (D) within the interval between O and (p-1), including the limits thereof, request means cum second transmission means fed by the second random number generating means for generating and transmitting a processing request to the verified, in the verified first calculating means fed by the second transmission means to calculate the product in the ring of integers modulo N of the first random integer r, and the D-th power of the inverse accreditation information B to feed said product as a marker $t = r.B^D$ mod N to the first transmission means, in the verifier second calculating means fed by the first transmission means for calculating the product of the marker t, within the ring of integers modulo N, and the D-th power of the shaded identity J, i.e. $t^p j^D$ mod N, in the verifier second compression means fed by the second calculating means for computing a result by taking as arguments the message to be authenticated and said product, in the verifier comparing means fed by said second compression means and by the first transmission means for in a single comparison step comparing said predetermined bit portion to a corresponding bit portion of said result and upon a detected equality issuing an "authentic message signal".

7. A station for use as the "verified" in a system as claimed in claim 6.

8. A station for use as the "verifier" in a system as claimed in claim 6.

9. A system for signing a message m by a presumably accredited entity, this accreditation having been formulated by a public-key process comprising the following operations:

an authority issuing the accreditation chooses two prime factors, forms the product N of these two factors, keeps secret these factors, chooses an integer p that comprises at least thirty bit positions of publishes N and p, for an entity that is a signatory a digital identity I is formed and supplemented by redundancy in order to form a shaded identity word J, accreditation in formation A is formulated by the authority by taking the p-th root of the shaded identity J in the ring of integers modulo N ($A = j^{1/p}$ mod N), said system comprising:

a memory medium held by the signatory for storing inverse information modulo N of the accreditation information A, i.e. the inverse accreditation information B (i.e., $B^p J$ mod N = 1), signature generating means for generating a signature according to a probabilistic digital process, and comprising:

random number generating means for generating a randon integer r that is a member of the ring of integers modulo N, power raising means fed by the random number generating means for raising r to the power p modulo N, compression means fed by the power raising means for calculating a compression function that has as arguments the message m and $r^p$ mod N to yield a result number D, product forming means fed by the random number generator and by the compression means to form the product of r and D-th power of the inverse accreditation information B to yield a sole marker t, transmission means fed by the product forming means to transmit a signal message comprising of the message m, the identity I, the result number D, and the sole marker t.

10. A signature generating station for use in a system as claimed in claim 9.

11. A station as claimed in claim 10 manufactured in the shape of a smart card.

12. A method for authenticating, comprising the following steps in a verifier element:

a) receiving, as first comparison data, at least a predetermined multibit field of a title number T calculated according to the equation $$T = r^p \bmod N;$$

b) drawing a second random number D within the closed interval $\{O, p-1\}$;

c) providing this second random number;

d) receiving a marker number t calculated according to the equation:

$$t = r.B^D \bmod N$$

e) generating second comparison data equal to $$T^p J^D \bmod N;$$

f) comparing the first comparison data to a corresponding multibit field of the second comparison data, and g) upon correspondence directly generating an authentication approbation, where p is a first published integer p of at least ten bits;

N is a second published integer which is a product of two secret prime factors;

J is a second personalized digital quantity with added redundancy formed from a first personalized digital quantity I;

B is an accreditation number stored outside the verifier element in the form of an inverse of A, A being equal to $J^{1/p}$ mod N, so that $B^p J$ mod N = 1; and r is a first random number not available to the verifier element which is a member of the ring of integers modulo N.

13. The method of claim 12 further comprising the step of initializing the quantities p, N, J, I, and B.

14. The method of claim 12 for authenticating an object element wherein B is stored in the object element; and
further comprising executing the following steps in the object element;
i) drawing the first random number r prior to step a);
ii) calculating the title number T prior to step a); and
iii) generating the marker number t prior to step d).

15. The method of claim 12, for authenticating a message m
wherein B is stored at an opposite side of a communication medium from the verifier element; and
the following steps are executed at that opposite side:
i) drawing the first random number r prior to step a);
ii) calculating the title number T prior to step a); and
iiii) generating the marker number t prior to step d).

16. A method of authenticating an object element using a verifier element comprising the following steps in the object element:
a) choosing a first random integer r, as a member of the ring of integers modulo N;
b) calculating a title number T according to the equation $T = r^p \bmod N$ c) providing at least a predetermined multibit field of the title number T as first comparison data to the verifier element;
d) receiving from the verifier element a second random number D drawn from the closed interval $\{0, p-1\}$;
e) calculating a marker number t according to the equation:

$t = r.B^D \bmod N$ f) providing the marker number t to the verifier element; and
g) receiving an authentication indication from the verifier element based on a comparison therein between the first comparison data and a corresponding multibit field of second comparison data calculated according to $t^p J^D \bmod N$, where
p is a first published integer p of at least ten bits;
N is a second published integer which is a product of two secret prime factors;
J is a second personalized digital quantity with added redundancy formed from a first personalized digital quantity I; and
B is an accreditation number, stored in the object element in the form of an inverse of A, A being equal to $J^{1/p} \bmod N$, so that $B^p J \bmod N = 1$.

17. Apparatus for authenticating an object element comprising
a) means for receiving data from and transmitting data to the object element;
b) means for drawing a random integer D within a closed interval $\{0, p-1\}$;
c) means for calculating second comparison data $t^p J^D \bmod N$;

d) means for comparing the second comparison data with first comparison data received from the object element which first comparison data is in the form of at least a multibit field of a title number T calculated according to the equation $T = r^p \bmod N$, where
p is a first published integer p of at least ten bits;
N is a second published integer which is a product of two secret prime factors;
J is a second personalized digital quantity with added redundancy formed from a first personalized digital quantity I;
r is a first random number which is a member of the ring of integers modulo N;
B is an accreditation number, stored in the object element in the form of an inverse of A, A being equal to $J^{1/p} \bmod N$, so that $B^p J \bmod N = 1$; and
t is a marker number to be calculated in and received rom the object element and which satisfies the equation:

$t = r.B^D \bmod N$.

18. An object element susceptible of being verified in a verifier element, the object element comprising:
a) means for transmitting data to and receiving data from the verifier element;
b) means for drawing a random integer r from the ring of integers modulo N;
c) means for calculating a title number T according to the equation $T = r^p \bmod N$;

d) means for storing an accreditation number B in the form of an inverse of A, A being equal to $J^{1/p} \bmod N$, so that $B^p J \bmod N = 1$;
e) means for calculating a number number t according to the equation:

$t = r.B^d \bmod N$;

where
p is a first published integer p of at least ten bits;
N is a second published integer which is a product of two secret prime factors;
J is a second personalized digital quantity with added redundancy formed from a first personalized digital quantity I; and
D is a second random number, received from a verifying element, chosen from the interval $\{0, p-1\}$.

19. A method of authenticating a message m, comprising executing the following steps in a verifier element:
a) receiving, as first comparison data from a communication medium, at least a first multibit field of a title number T, which title number is calculated by using the message m and a first intermediate value, $r^p \bmod N$, as arguments to a compression function;
b) choosing a second random number D within the closed interval $\{0, p-1\}$;
c) communicating the second random number to the communication medium;
d) receiving from the communication medium a marker number t calculated according to the equation:

$t = r.B^D \bmod N$;

e) calculating a second intermediate value according to $t^p J^D \bmod N$;

f) calculating second comparison data by using message m and the second intermediate value as arguments to the compression function;
g) comparing the first comparison data to a corresponding second multibit field of the second comparison data;
h) upon correspondence, generating an authentication signal; where
r is a first random integer which is a member of the ring of integers mod N and which is known at an opposite side of the communication medium;
p is a first published integer p of at least ten bits;
N is a second published integer which is a product of two secrete prime factors;
J is a second personalized digital quantity with added redundancy formed from a first personalized digital quantity I; and
B is an accreditation number stored at an opposite side of the communication medium in the form of an inverse of A, A being equal to $J^{1/p}$ mod N so that $B^p J$ mod $N=1$.

20. The method of claim 19 wherein the following steps are executed at that opposite side;
  i) drawing the first random number r prior to step a);
  ii) calculating the title number T prior to step a); and
  iii) generating the marker number t prior to step d).

21. The method of claim 19 further comprising the steps of initializing p, N, J, I and B.

22. A method for authenticating a message m comprising the following steps at an opposite side of a communication medium from a verifier element:
  a) drawing a first random integer r at random from the ring of integers modulo N;
  b) generating, as first comparison data, a title number T which title number is calculated by using the message m and a first intermediate value, $r^p$ mod N, as arguments to a compression function;
  c) transmitting at least a first multibit field of the title number to the verifier element;
  d) receiving from the verifier element a second random number D chosen from the interval $\{0, p-1\}$;
  e) calculating a marker number t according to the equation:

$$t = r \cdot B^D \bmod N;$$

f) transmitting the marker number to the verifier element;
  g) receiving an authentication signal from the verifier element when the first comparison data corresponds to corresponding bits of second comparison data, generated by using the message m and a second intermediate value, $t^p J^d$ mod N, as arguments to the comparison function where
  p is a first published integer p of at least ten bits;
  N is a second published integer which is a product of two secret prime factors;
  J is a second personalized digital quantity with added redundancy formed from a first personalized digital quantity I; and
  B is an accreditation number stored at the opposite side in the form of an inverse of A, A being equal to $J^{1/p}$ mod N, so that $B^p J$ mod $N=1$.

23. A method for signing a message m by an accredited entity, said method comprising the following accreditation steps by an accrediting authority;
  a) generating and disclosing a first integer p of at least thirty bits and a product N of two secret prime factors;
  b) generating a first personalized digital quantity I with added redundancy to form a second personalized digital quantity J;
  c) generating and storing into a medium held by the accredited entity an accreditation number B as the inverse of $A = J^{1/p}$ mod N, so that $B^p J$ mod $N=1$;
  d) drawing a first random integer r which is a member of the ring of integers modulo N;
  e) calculating a first intermediate value $d = r^p$ mod N;
  f) applying a compression function f to first and second arguments, where the first argument is the message m and the second argument is the intermediate value D;
  g) generating a sole marker t according to the equation $$t = r \cdot B^D \bmod N;$$

h) transmitting the message m, the identity I, the first intermediate value D and the marker t as a signed message.

* * * * *